(12) United States Patent
Todd et al.

(10) Patent No.: US 12,045,739 B2
(45) Date of Patent: Jul. 23, 2024

(54) BEST OUTCOME AIOps MODELING WITH DATA CONFIDENCE FABRICS

(71) Applicant: EMC IP Holding Company LLC, Hopkinton, MA (US)

(72) Inventors: Stephen J. Todd, North Andover, MA (US); Nicole Reineke, Northborough, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 877 days.

(21) Appl. No.: 17/134,898

(22) Filed: Dec. 28, 2020

(65) Prior Publication Data

US 2022/0207386 A1 Jun. 30, 2022

(51) Int. Cl.
*G06F 16/27* (2019.01)
*G06N 5/04* (2023.01)

(52) U.S. Cl.
CPC .............. *G06N 5/04* (2013.01); *G06F 16/27* (2019.01)

(58) Field of Classification Search
CPC ...................................................... G06F 16/27
USPC ........................................................ 706/11
See application file for complete search history.

(56) References Cited

U.S. PATENT DOCUMENTS

| D311,713 | S | * | 10/1990 | McAfee | ........................ | D12/128 |
| D478,668 | S | * | 8/2003 | Epstein | ........................ | D24/187 |
| 7,281,084 | B1 | * | 10/2007 | Todd | ........................ | G06F 13/28 |
| | | | | | | 711/108 |
| 10,977,153 | B1 | * | 4/2021 | Reineke | ................ | G06F 9/5011 |
| 10,997,113 | B1 | * | 5/2021 | Reineke | .............. | G06F 9/45558 |
| 11,308,076 | B2 | * | 4/2022 | Todd | .................... | G06F 16/2237 |
| 2006/0155943 | A1 | * | 7/2006 | Todd | ....................... | G06F 16/162 |
| | | | | | | 711/161 |
| 2018/0111925 | A1 | * | 4/2018 | Ameriks | ............... | C07D 471/04 |
| 2018/0111933 | A1 | * | 4/2018 | Ameriks | .............. | C07D 401/14 |
| 2019/0004789 | A1 | * | 1/2019 | Mills | ...................... | H04L 9/3239 |
| 2020/0042657 | A1 | * | 2/2020 | Todd | ......................... | G06F 30/20 |
| 2020/0393822 | A1 | * | 12/2020 | Davis | ............... | G05B 19/41865 |
| 2021/0133599 | A1 | * | 5/2021 | Reineke | ................... | G06N 5/04 |
| 2021/0405983 | A1 | * | 12/2021 | Todd | ....................... | G06F 21/64 |

(Continued)

OTHER PUBLICATIONS

Grieves et al, "Digital twin: Mitigating unpredictable, undesirable emergent behavior in complex systems" Transdisciplinary perspectives on complex systems, Springer, Cham (2017), pp. 85-113 (Year: 2017).*

(Continued)

*Primary Examiner* — Reza Nabi
(74) *Attorney, Agent, or Firm* — Workman Nydegger

(57) ABSTRACT

One example method includes receiving a transaction at a digital twin that incorporates all transactions that have occurred at a site from which the transaction was received, and wherein the digital twin was created based in part on a data confidence fabric ledger, entering the transaction in the data confidence fabric ledger at the digital twin, receiving another transaction at the digital twin, wherein the another transaction has caused a problem to occur, entering the another transaction in the data confidence fabric ledger, replaying any transactions that have occurred in a defined time window that includes the another transaction, based on the replaying, identifying a state of a system where the problem occurred, and a time when the problem occurred, and determining a resolution to the problem.

18 Claims, 12 Drawing Sheets

(56) References Cited

U.S. PATENT DOCUMENTS

| | | | | |
|---|---|---|---|---|
| 2021/0406248 A1* | 12/2021 | Todd | ........................ | G16Y 30/00 |
| 2021/0409436 A1* | 12/2021 | Todd | ................... | H04L 63/1416 |
| 2022/0058182 A1* | 2/2022 | Lee | ......................... | G06Q 50/10 |
| 2022/0138325 A1* | 5/2022 | Todd | ........................ | G06F 21/54 |
| | | | | 726/26 |
| 2022/0207386 A1* | 6/2022 | Todd | ........................ | G06N 5/04 |
| 2023/0058169 A1* | 2/2023 | Cella | ...................... | G06N 3/126 |
| 2023/0101183 A1* | 3/2023 | Cella | .................. | G01C 21/3407 |
| | | | | 701/31.4 |

OTHER PUBLICATIONS

Papacharalampopoulos, A.; Giannoulis, C.; Stavropoulos, P.; Mourtzis, D. A Digital Twin for Automated Root-Cause Search of Production Alarms Based on KPIs Aggregated from IoT. Appl. Sci. 2020, 10, 2377. (Year: 2020).*

* cited by examiner

BEST OUTCOME AIOps MODELING WITH DATA CONFIDENCE FABRICS

FIELD OF THE INVENTION

Embodiments of the present invention generally relate to creation and use of operation simulators. More particularly, at least some embodiments of the invention relate to systems, hardware, software, computer-readable media, and methods for creation and use of a simulator that is operable to simulate operations of automated infrastructure tuning software.

BACKGROUND

Corporate data management system may contain catalogs of corporate software and hardware data assets. In an enterprise context, these catalogs can track tens of thousands of laptops, servers, and storage devices and hundreds of thousands of different software instances. These are typically snowflake configurations, that is, no one data management ecosystem is the same as the environment of any other enterprise. This complex ecosystem must be monitored with vigilance from a data management perspective. If bugs or defects penetrate into these complex environments, they can wreak havoc and leave little trace of what went wrong.

However, it is difficult, if not impossible, for a software or hardware vendor to qualify a product that can handle all possible permutations in every ecosystem in which that software or hardware might be deployed. As well, it is equally difficult to determine root cause after an enterprise reports an issue. These problems can present a new set of problems that an automatic infrastructure tuning software may have never encountered before.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
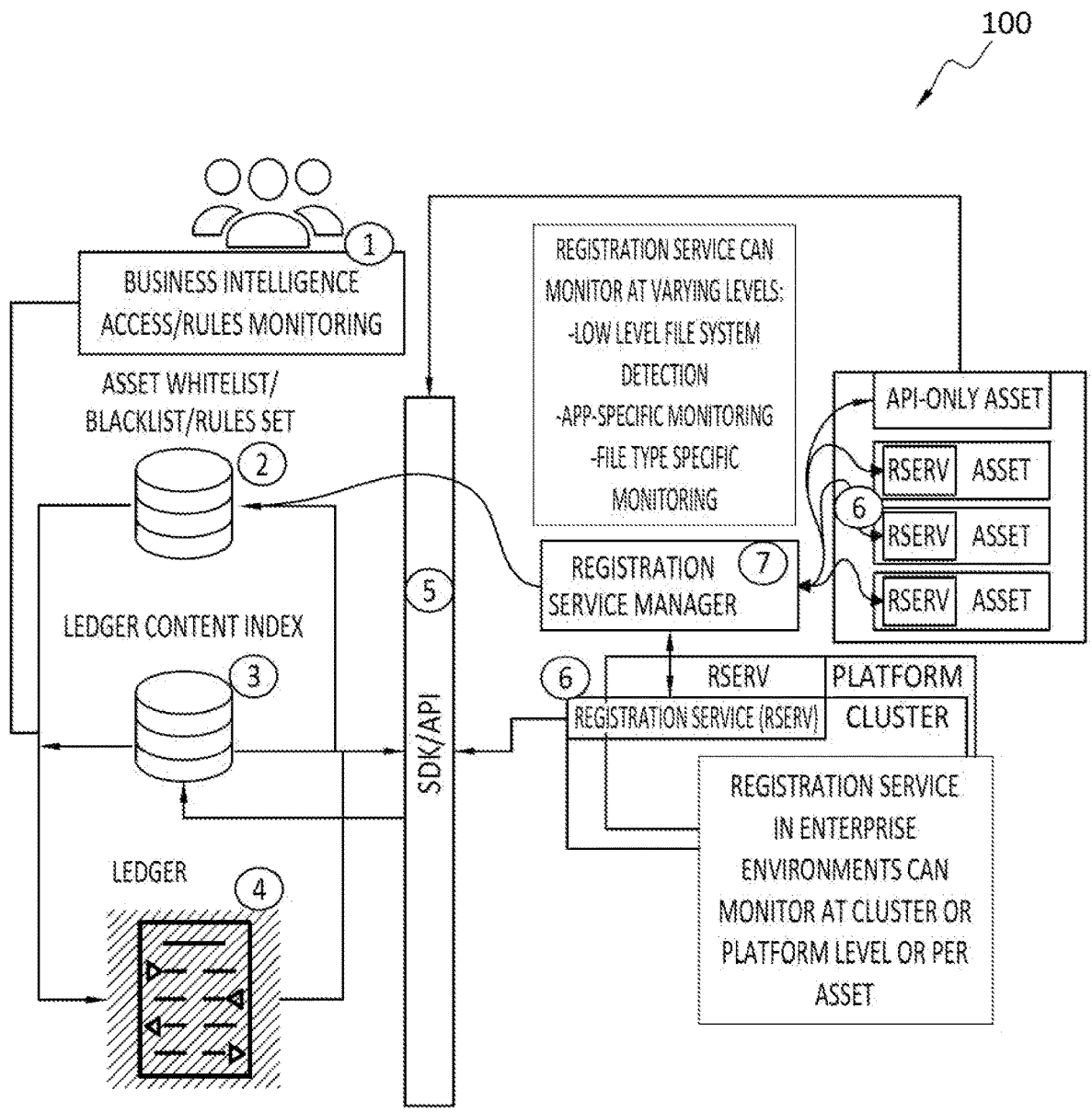
FIG. 1 discloses aspects of ledger-based annotation of enterprise data activities.

Embodiments of the present invention generally relate to creation and use of operation simulators. More particularly, at least some embodiments of the invention relate to systems, hardware, software, computer-readable media, and methods for creation and use of a simulator that is operable to simulate operations of automated infrastructure tuning software such as may be deployed in data management environments. However, the scope of the invention is not limited to such environments, nor limited to simulation of the operations of automated infrastructure tuning software but, rather, extends more broadly to simulation of the operations of any other software, algorithms, methods, processes, and routines, that may be implemented in a computing environment, examples of which are disclosed herein.

In general, example embodiments of the invention may be implemented, for example, in an enterprise data management ecosystems. Such ecosystems may be varied and complex and, as a result, may present a number of different problems when diagnosing problems or trying to predict behaviors in the ecosystem.

Example embodiments of the invention may operate in connection with AIOps (Artificial Intelligence for IT operations) platforms which, among other things, are concerned with automatically integrating, and/or causing the integration of, new and/or modified software and/or hardware into existing computing environments. AIOps platforms may also remove, and/or cause the removal of, hardware/software from computing environments. To these ends, at least some AIOps platforms may comprise automated infrastructure tuning software, although the scope of the invention is not limited to use with such software, nor to use with AIOps platforms.

With the foregoing in view, some example embodiments of the invention may leverage data confidence fabric (DCF) techniques to create digital twin ecosystem models. These models may enable the running of AIOps simulators that can provide real-time predictive outcomes that are fed back into automated responses with the highest confidence. No conventional digital twins have the capability to "measure future confidence," that is, confidently predict, or enable confident predictions of, how an environment might respond when changes are made to a hardware configuration and/or a software configuration of that environment.

Embodiments of the invention may operate in connection with a system in which all data management operations are being tracked and entered into a system ledger. In general, such a system may invoke data confidence fabric functionality on every data creation and modification event by inserting confidence information with respect to such data. To briefly illustrate, if an employee laptop has been whitelisted as a Data Confidence Fabric (DCF) member, that laptop may annotate all data creation or modification events that it performed, and these annotations, along with a confidence score, may be placed into a ledger. In this way, all data management operations occurring on whitelisted devices, such as the laptop, may be tracked and monitored in a time-stamped, immutable, and trusted corporate ledger.

As provided by some example embodiments, such a ledger that supports DCF annotations may be turned into a digital twin. In general, the digital twin may serve as an information mirroring model that enables autonomous and guided interactions against simulated events. By moving backwards or forwards in the time-stamped ledger, the digital twin may model all system state activity at any given point in time, allowing replay to occur over any time-window that is of interest. This approach may open up a wide variety of solutions to many of the challenges experienced in conventional data management systems.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the impact of a change in the hardware, software, and/or, configuration, of a system, such as a data management system for example, may be observed and assessed in advance of the actual deployment of the change, and possible causes and solutions to any problems identified. As another example, an embodiment may enable the outcome of an assessment to be employed as an input by an AIOps platform in connection with an automatic deployment process implemented by the AIOps platform. An embodiment may enable system activity for a particular period of time to be replayed, and thereby further enable identification of an event and/or time associated with the occurrence of a problem in a simulation.

It is noted that embodiments of the invention, whether claimed or not, cannot be performed, practically or otherwise, in the mind of a human. As indicated by the illustrative examples disclosed herein, some embodiments of the invention are applicable to, and find practical usage in, environments in which the deployment and integration of large numbers, such as hundreds, or thousands, or more, of applications, systems, and hardware, may be managed in connection with an AIOps platform, whose operations may be simulated by one or more embodiments of the invention. Such deployments and integration may occur on a substantial and ongoing basis. Thus, simulation of such operations by embodiments of the invention is simply beyond the mental capabilities of any human to perform practically, or otherwise. Moreover, while certain, simplistic, examples are disclosed herein, those are only for the purpose of illustration and to simplify the discussion, but should not be interpreted as exemplifying real world applications of embodiments of the invention. Accordingly, nothing herein should be construed as teaching or suggesting that any aspect of any embodiment of the invention could or would be performed, practically or otherwise, in the mind of a human.

A. Overview

Many businesses use their data as a competitive advantage. Corporate data may be used to reduce operational costs, increase revenue and even predict behavior. It is essential for organizations to have full access to all data content, of business priority, on a continual basis, to understand the relative context of the data, and to have immutable proof that the data being used for critical decision making is not externally manipulated.

For example, it may be challenging for corporations to maintain a compliant and functional enterprise data environment, or other computing environment, in a number of different use cases. In one such example use case, when new software or hardware is introduced into an enterprise data management ecosystem, that new software or hardware can inadvertently cause business disruption such as through hardware/software malfunctions or failures, or compliance violations, because the hardware or software is operating in an environment that it has never seen before, that is, an environment in which its operation has never been tested. Due to the fact that there may be an endless variety of different enterprise configurations in which particular hardware and/or software may potentially be deployed, this example use case may be common.

In another, related, use case, the conditions, such as bugs for example, that lead to disruptions or compliance issues in the system, such as those just described, often go undiagnosed after the fact. Bugs or defects may continue unidentified, and unresolved, causing additional business damage in the future.

Still another use case that may be encountered in environments such as those disclosed herein concerns the employment of automated infrastructure tuning software, such as AIOps platforms which may comprise AI (Artificial Intelligence) or rules engines. Such platforms and engines may observe data management ecosystems, or other computing or storage systems, and automatically make changes, such as to the configuration/software/hardware of the data management ecosystem. In some instances, the automatic implementation of such changes, while beneficial in terms of speeding up new deployments of hardware/software, may nonetheless cause significant business damage when incorrect decisions are made, by the AI, in the midst of implementing changes in never-before-seen operating environments. The benefits of AIOps, such as automatically and intelligently correcting some problems as changes are made to the operating environment, may nonetheless cause significant damage, as explained below.

For example, there is currently no mechanism to model the large, and dynamic, number of data generation/modification configurations that typically exist in an enterprise data management ecosystem. The same is more generally true with regard to other systems and ecosystems as well. As a result, Dev (Development) and QA (Quality Assurance) processes for new products and services expected to be automatically installed in the enterprise system may not have been exposed, during research and development, to the specific configuration(s) in which those products and services will be installed. Thus, the Dev and QA processes may not be able to suggest changes to new products and services prior to deployment of those products and services in the enterprise system. That is, problems and defects that arise after installation typically have not been encountered by the AIOps systems during the Dev and QA processes. Thus, such problems and defects represent a business risk should the AIOps make a bad decision regarding installation of new software or hardware, for example, based on the never-before-encountered defect.

Another concern with conventional automated implementation of hardware/software in a computing environment relates to post-mortem root-cause analysis of defects. Particularly, once these defects do occur in a complex data management system, or other computing environment, very little context is provided back to the vendor of the hardware or software to perform a root-cause analysis as to why the defect or problem occurred. In addition, the enterprise customer experiencing the defect may not be willing to allow access to the environment in which the defect occurred. As a result, defects cannot be reproduced, identified and corrected, leaving enterprise business processes at additional risk of disruption. It would be ideal for an enterprise to be able to provide a "snapshot of system state" of the ecosystem at the time a defect occurred. This would allow a vendor to have much more context into the environment at the time the defect occurred. As discussed below however, it may be difficult to provide such state information.

Particularly, enterprise data management systems will oftentimes take snapshots of data at a given point in time. However, the enterprise assets, such as hardware/software systems like employee laptops or enterprise servers for example, that were involved in data creation or modification are not listed or included as part of this snapshot. So a vendor attempting to diagnose a problem has no visibility into how or when data was modified, or as to how their hardware/software played a part in those modifications.

Still another challenge that may be presented by conventional automated implementation of hardware/software in a computing environment relates to the inability to safely diagnose defects using an enterprise on-premises, or 'on-prem,' simulator. In particular, another valuable approach that may allow a vendor to diagnose their enterprise software/hardware defects would be to run the vendor product against a live simulation of the environment of that enterprise. This type of simulation might preferably be conducted in an off-line, that is, non-production, setting. Unfortunately however, typical enterprises are not able to create such a simulation from their operating environments, although the entity may be best equipped and qualified to do so.

As apparent from the foregoing examples, there is presently no ability to charge hardware and software vendors for running their products against simulated enterprise environments. As at least some embodiments provide this capability, such embodiments may enable implementation of a Simulation as a Service (SaaS) to which vendors could subscribe in order to determine how their hardware or software would likely perform in the actual enterprise environment.

In relation to the foregoing, and absent suitable controls, if a vendor test software had visibility into an enterprise ecosystem, such as to determine why a bug was occurring for example, the vendor might have visibility into data assets that should not be accessible to them. At present, there is no way to allow a vendor access to enterprise system state information without potentially giving the vendor access to enterprise data as well.

Finally, there is, at present, no way for an AIOps algorithm or platform, or platforms of comparable functionality, to reduce the risk of automated decisions that the AIOps algorithm or platform may make when implementing a change in the hardware/software/configuration of a computing environment. As AIOps becomes more automated, runaway scripts can end up making disastrous choices that also impact business continuity. There is currently no way for these scripts to look at internal models or simulations of their ecosystems and quickly run "what-if" scenarios to make better-informed choices concerning change implementations.

B. Aspects of Some Example Embodiments

In general, example operating environments for various embodiments of the invention embrace, but are not limited to, data storage environments, computing environments, cloud computing/storage environments, on-premises computing and storage environments, and any other environment where aspects of one or more embodiments may be useful. Thus, while reference is made herein to the particular example of data storage and management environments, the scope of the invention is not limited for use in those environments.

B.1 Aspects of an Example Data Confidence Fabric

With reference now to FIG. 1, aspects of an example data confidence fabric (DCF) 100 are disclosed. In general, the DCF 100 may be configured, and operate, to track enterprise data activity such as, for example, creation, modification, and deletion, of data. In the example of FIG. 1, a Registration Service Manager [7] is disclosed that may enable enterprise data tracking/management in a variety of devices such as, for example, laptops, servers [6]. The actions of the Registration Service Manager may result in a system in which all data creation, modification, or other data processing activities, are observed and recorded in a corporate ledger [4] and indexed [3]. As disclosed elsewhere herein, embodiments of the invention may operate in connection with a configuration such as the DCF 100. A whitelist/blacklist [2] may include a list of devices or other assets that are, or are not, permitted to make entries into the corporate ledger [4] or to contribute data to the DCF 100. A rules set [1] may be provided that includes rules specifying which devices, systems, files, applications and executables, software, and/or other assets, may be included in, or excluded from, the DCF 100. Ledger [4] entries may be created by way of an SDK (Software Development Kit) or API (Application Program Interface) [5].

Figure 2:
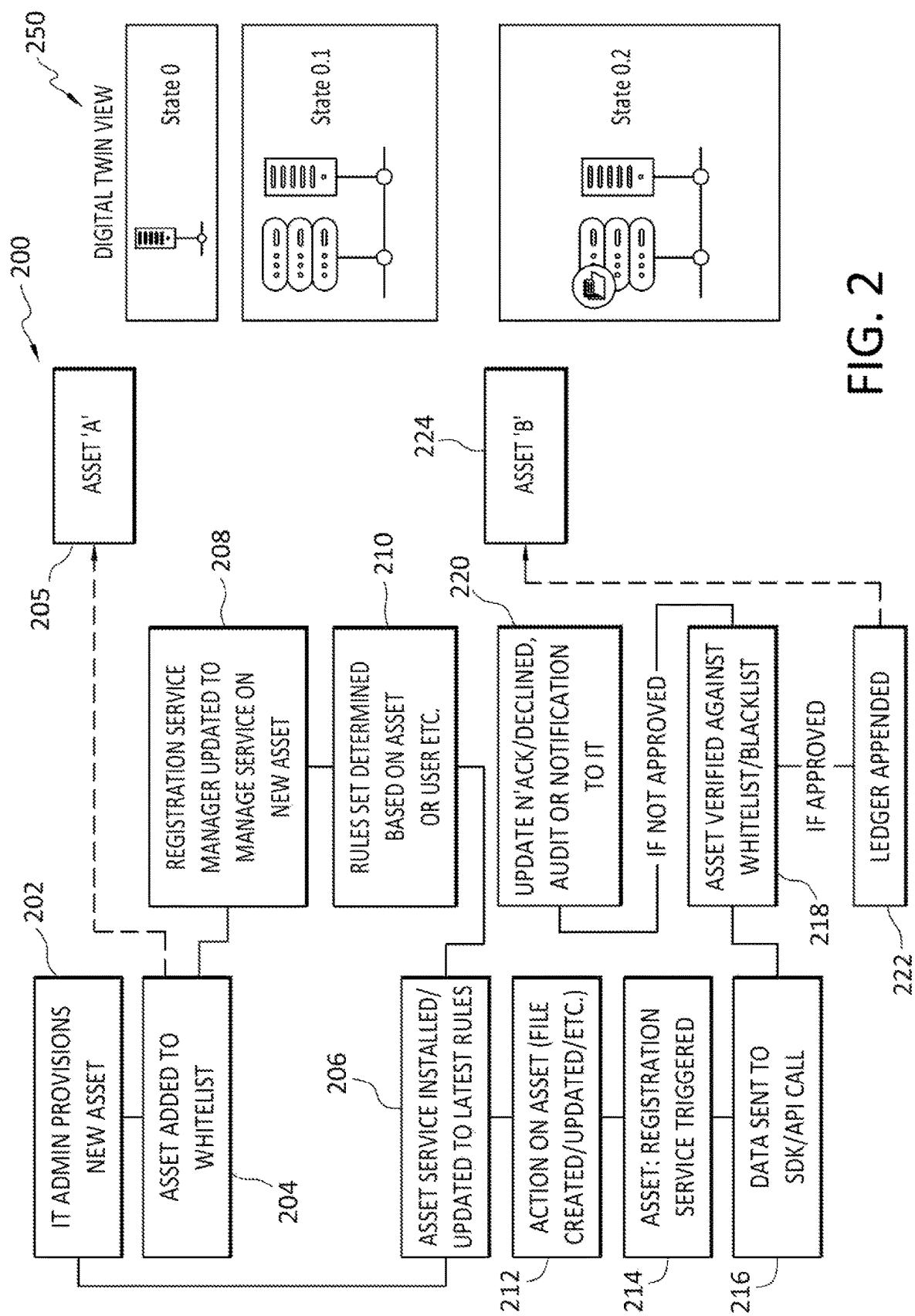
FIG. 2 is a workflow diagram which discloses aspects of asset insertion in a digital twin.

With reference next to FIG. 2, an example configuration and workflow are disclosed that indicate where and how, in a process workflow, insertion of an asset into a digital twin might be implemented. As explained below, the asset may be white-listed prior to insertion into the digital twin. It is noted that the simplified example of FIG. 2 is presented only as an illustration of how one example implementation of the digital twin simulation may create versions and new asset and content maps based on a single update for help in understanding the high level concept. In practice, an SDK/API (see, e.g., reference [5] in FIG. 1) may be processing many thousands of requests coming from assets throughout an enterprise.

With more particular reference now to FIG. 2, the example method 200, which may be performed at/by a DCF, may begin with the provisioning 202 of a new enterprise asset. As noted, an 'asset' as employed herein embraces, but is not limited to, any one or more of hardware devices, systems, files, applications and executables, databases, and software.

After the enterprise asset has been provisioned 202, such as by an enterprise IT department, the asset may be added 204 to an 'Inclusion' list which lists those assets that are permitted to add data to a DCF of the enterprise. At this point, an asset 'A' may then be added 205 to a digital twin 250. After the asset 'A' has been added 204 to the 'Inclusion' list, an asset registration service on the asset 'A' may be installed, or updated, as applicable, to reflect a latest version of one or more rules 206 generated by an entity such as the IT department. The rules may concern registration, such as in a ledger for example, of data generated by the asset 'A.' Correspondingly, an entity such as a registration service manager may be updated 208 to manage the registration service installed/updated 206 on the new asset 'A.'

At 210, an applicable rule set for the asset 'A' may be determined based on various information, which may or may not be asset-specific. Such information may include, but is not limited to, a device ID, or a user associated with that asset 'A.' At this point in the method 200, the asset may be ready to begin performing data operations, such as CRUD operations for example.

Accordingly, the method 200 may proceed to 212 where the asset 'A' performs an action or operation on a dataset, for example. More particularly, an application at the asset 'A' may perform the asset operation. In response to performance of the operation 212, an asset registration service may be triggered 214, and the data associated with performance of the operation 212 sent to an SDK/API call 216.

The asset 'A' that performed the operation 212 may then be submitted for verification 218 as present on an Inclusion List, or not present on an Exclusion List. If the asset 'A' is not verified, that is, not approved to submit data to the DCF, then the system may decline 220 to add the asset 'A' to the DCF. On the other hand, if the asset 'A' is verified, then a ledger may be appended 222 to include the new/modified data that was generated as a result of the operation 212.

As well, performance of the operation 212, and/or addition 222 of data to the ledger, may cause the DCF to generate metadata corresponding to the new/modified data resulting from the operation 212. This metadata may be stored by the DCF in the ledger in association with the new/modified data that resulted from the operation 212. In the example of FIG. 2, after the ledger is appended 222, another asset, namely, asset 'B,' may be added 224 to the digital twin 250. The asset 'B' may be a file created by asset 'A,' although that is not required.

As illustrated by the simple example of FIG. 2, assets may take various forms, and may be added to the digital twin 250 at various times in a workflow, so as to define, or contribute to the definition of, various states at the digital twin 250. The digital twin 250 thus mirrors the configuration of the system that includes the assets 'A' and 'B.' In more detail, State 0, neither asset 'A' nor 'B' is present in the system. At state 0.1, asset 'A' has been added to the digital twin 250, and at state 0.2, asset 'B' has been added to the digital twin 250.

With continued reference to the example of FIG. 2, a copy of the ledger can be brought into a simulated environment, that is, outside of a production context, and a digital twin, such as the example digital twin 250, may be invoked and created based on that ledger. With the digital twin 250, a vendor may be allowed to observe the operation of different hardware and software elements at the time that a problem or defect occurred in the digital twin. This approach may provide useful state information to the vendor. Moreover, the use of the digital twin to obtain such information may be made available to the vendor for a fee. And, as vendors or enterprise application developers begin to develop new features for their software, they may use "ledger-enabled digital twins" to test and qualify their code against a wide variety of simulated data management ecosystems.

Embodiments of the invention may also provide for filtering, anonymization, or isolation of data assets from potential users of the digital twin. For example, a super-user may not only be able to witness the system change state during a replay operation, but the super-user may also be able to access the actual data sets that were being created at the time. Other less powerful users, however, may not be able to access the data.

Finally, automated DevOps scripts may be given real-time access to the digital twin capability. This approach may allow, for example, a script to "try out" several different scenarios to a given failure scenario, observe the behavior of the digital twin, and then make an automated decision based on the observed behavior. This functionality may be particularly useful in the case of AIOps.

Figure 3:
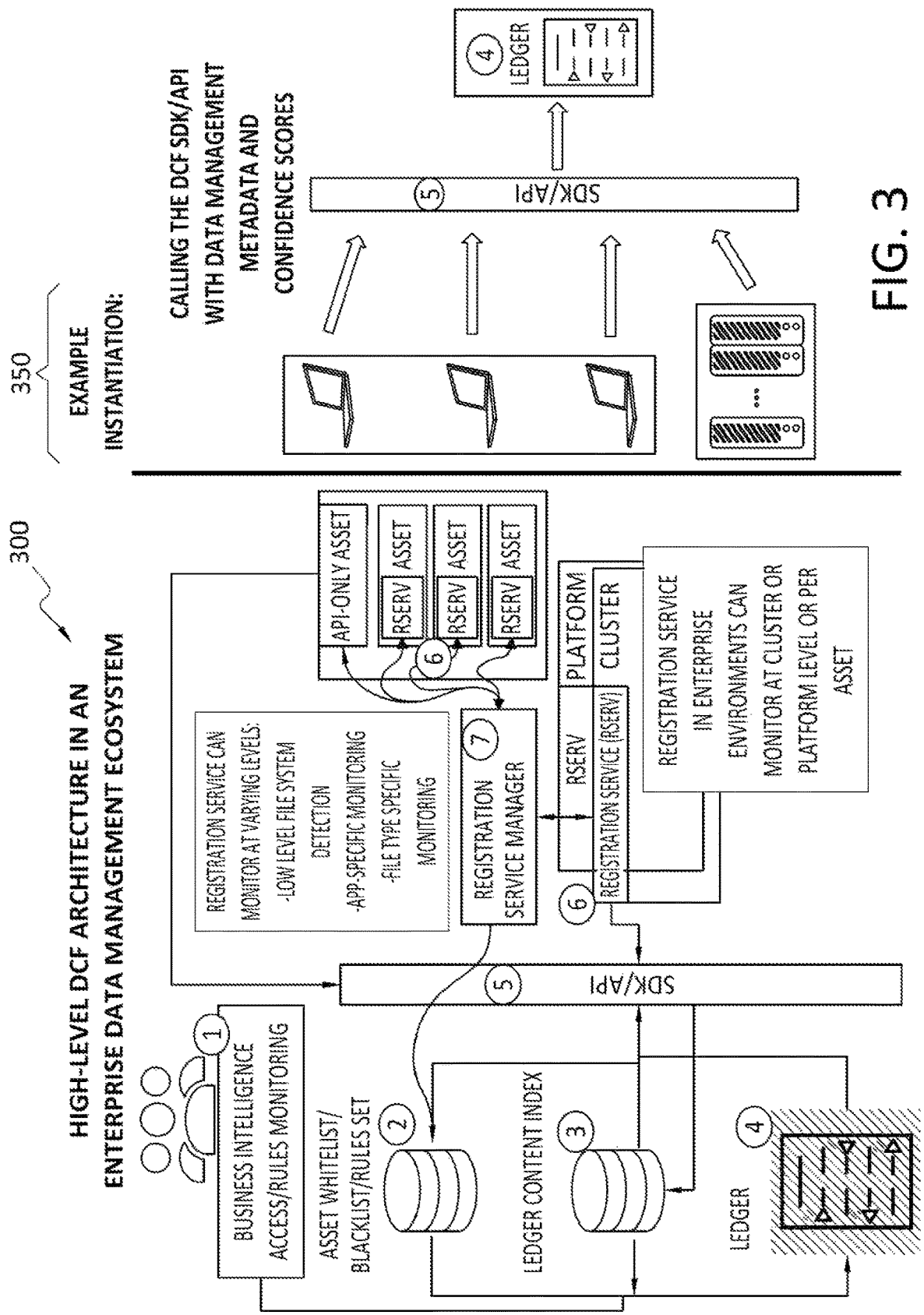
FIG. 3 discloses an example instantiation of an enterprise DCF.

With reference next to FIG. 3, aspects of an example instantiation of a DCF are disclosed in connection with which embodiments of the invention may be employed. Among other things, the example of FIG. 3 discloses a configuration 300 in which trusted devices of various types, examples of which are disclosed herein, may be added to an enterprise DCF.

The configuration 300 may include business intelligence access and rules monitoring functionality (Area 1 in FIG. 3). Thus, one possible first step, using DCF principles, to implement a more trustworthy enterprise, that is, an enterprise in which devices and associated data may considered as trustworthy, may be to make a provision to "Include" a device, system, asset, and/or software, as a trusted member of the DCF that may be permitted to contribute to the DCF, and to "Exclude" a device, system, asset, and/or software, that is not trusted and whose data may not be permitted to be contributed to the DCF.

Thus, as shown in Area 2 in FIG. 3, an enterprise may include one or more databases other storage devices and/or which may be employed to store, and enable access to, one or more rule sets (Area 2 in FIG. 3) specifying device(s), systems, and/or, software, that are included in the DCF, and devices that are not permitted to access the DCF. That is, the rule set may specify an inclusion list, and an exclusion list. The exclusion list may include, for example, known device types or assets that are associated with, for example, nefarious actors. Enabling the pre-screening of potential DCF assets may help to ensure that assets ultimately permitted to join the DCF provide only trustworthy content for decision making and auditing.

In more detail, and with continued reference to FIG. 3, one example process is briefly summarized as follows. Initially, an IT Administrator, operating with/as the business intelligence access/rules monitor (Area 1) may access the rule set (Area 2 in FIG. 3) to add, change, and/or delete, one or more rules specifying which respective devices, systems, and/or software, are included/excluded in/from the DCF.

Post deployment of software that enables participation by a device in the DCF, a registration service (Area 6) may send an update request, concerning a device that has requested to join the DCF, via a registration service manager (Area 7) which may validate membership of the device, for example, in the DCF by checking a device ID of the device against an inclusion list and/or exclusion list (Area 2). If it is determined that the device is on an inclusion list, or does not appear in an exclusion list, the registration service, in the case of an asset that contains a registration service, or the registration service manager in the case of an asset accessed via API polling, may then create one or more ledger entries (Area 4) via, for example, an SDK (software development kit) or API (application program interface) (Area 5). The ledger entry may indicate, for example, that data generated by the device may be permitted to be contributed to the DCF, and the ledger entry may also include an identifier that uniquely identifies the device. The content of the ledger may be indexed (area 3) for monitoring such as by an administrator (Area 1), which may be performed on a continual and/or ad hoc basis, so that the administrator/DCF may maintain an ongoing and up to date awareness of which devices, and their respective data, are permitted to participate in the DCF.

With continued reference to the example of FIG. 3, it is noted that there may be multiple instances of a registration service (Area 6). In particular, a registration service may be implemented at various levels such as, but not limited to, a platform level, which may include one or more clusters of one or more assets or devices, and/or more granularly, at the cluster level or at an individual asset level, one example of which is a device or application. The registration service may thus be configured, and operate, based upon the nature of the asset that requests to be added to the DCF.

As further indicated in FIG. 3, an example grouping 350 of assets is disclosed, namely, three laptops and a cluster of servers that have been whitelisted by a DCF registration service. This means that any data management operations that occur on any of those assets such as, for example, object create, database row delete, or file modification, may result in a call to the DCF SDK/API [5], which may in turn inserts DCF metadata and confidence scores into a ledger. This DCF metadata may contains a description of the asset, its environment, the nature of the data management operation, a timestamp, and any other relevant metadata.

Note that the simple configuration disclosed in FIG. 3 is presented for illustrative purposes. In real world conditions and environments, the SDK/API [5] may be processing many thousands of requests coming from assets throughout an enterprise. The discussion, below, of FIG. 4, discloses the building of a digital twin. This process may then be used as the basis for novel AIOps algorithms that may calculate a "potential confidence" of automated diagnosis scenarios.

B.2 Creation of a Digital Twin

Figure 4:
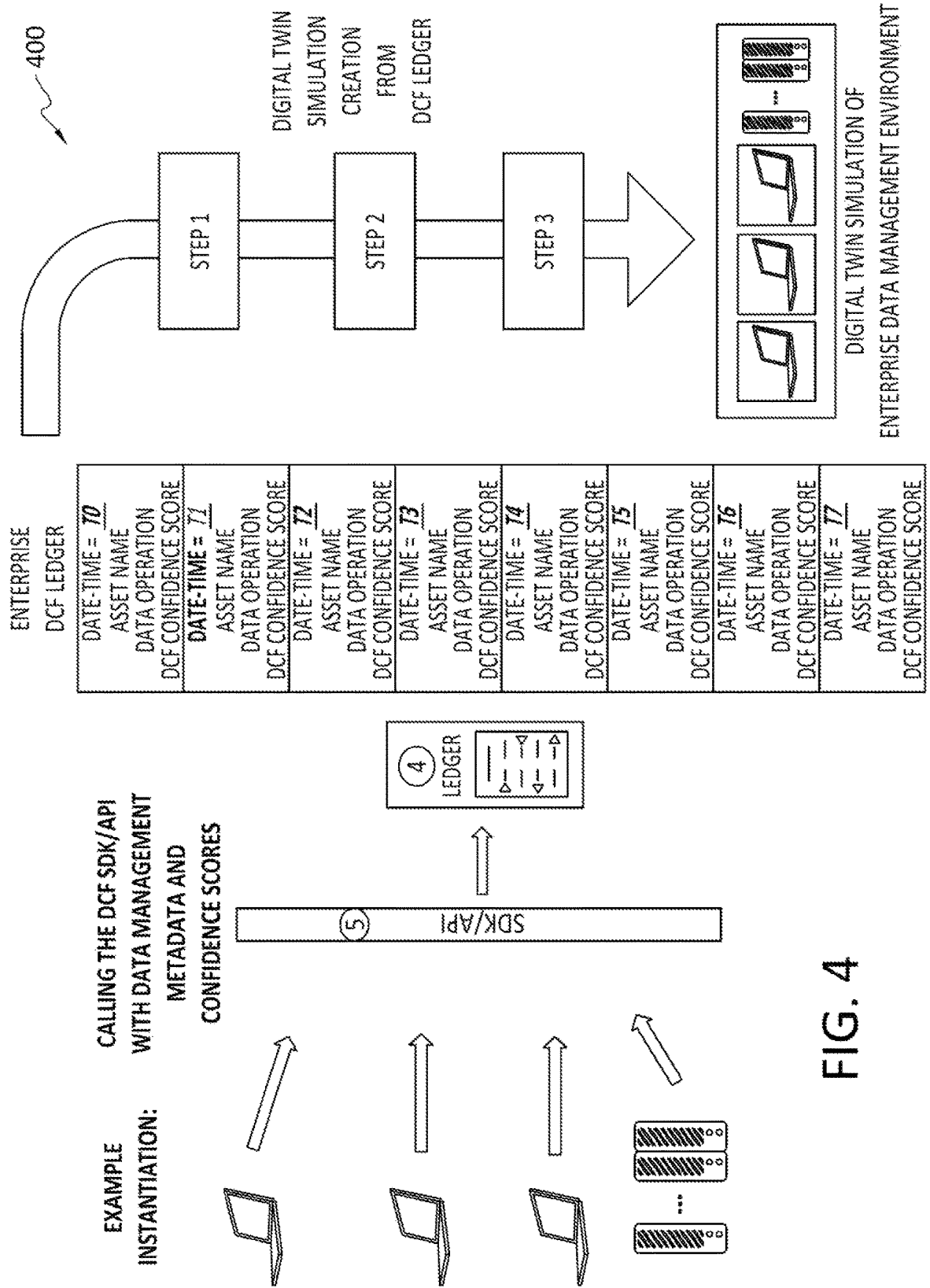
FIG. 4 discloses creation of digital twin simulation from DCF ledger.

With reference now to FIG. 4, details are provided concerning a configuration 400 that may enable the booting of an example of digital twin from the example enterprise DCF disclosed in FIG. 3 discussed above. In general, FIG. 4 discloses expansion of a ledger entry so that the metadata within can be more fully inspected. FIG. 4 also highlights a digital twin boot process that is able to re-create a functional digital twin simulation of the environment based on the state in the ledger.

In more detail, the ledger [4] has been expanded in FIG. 4 to highlight a specific range in time (T0-T7) in which data management operations were captured in the DCF ledger. A digital twin simulation of those data management operations may then be created by way of the following operations:

1. Step 1: Population of State 0 Assets: Registration of all whitelisted assets and their known 'Day 0' content into the digital twin. This may accomplished through the use of master rules to recreate the whitelisted asset content with access to secondary sources for asset configuration details not supplied in the ledger or rules. For instances where a 3D model is desired, the digital twin may use secondary network information to include communication paths or an asset registration database to detail physical topology for use in visualization.
2. Step 2: Population of State 0 ledger content. On initial ledger registration, a baseline set of known records may exist. An example of this is a brownfield environment where there are existing laptops that each contain a directory full of documents. The documents may be discovered on the initial run of the ledger discovery service, and added to the ledger as 'State 0.' Recreation of the data in the secondary location, that is, the digital twin, may accomplished through use of the access keys from the ledger to recover a copy of each individual ledger entry (or its sub-content permissioned by the access key) into the digital twin environment and create a digital association of the ledger entry onto the state 0 assets.
3. Step 3: Ongoing differential copy and recreation with versioning. Any changes hereafter cause a differential update of the digital twin with any new information. This is inclusive of updates to the ledger, which may be trusted changes and immediately included, the modification of asset information in the rules engine. Versioning and notification of non-trusted data may enable easy roll-out and triggers, should it be required. Note that due to the ledger containing detailed understanding of 'accessdate,' 'createdate,' and other modification details, any delay in creation of the digital twin copy may be only temporary and may not be reflected in the ability to replay the digital twin, as replay may be available based on the datetime stamps from the ledger and not from the copy.

B.3 Operation and Use of a Digital Twin

As a result of the process described above in connection with FIG. 4, a digital twin simulation of the enterprise data management environment, or other environment, may then be performed. In particular, once the digital twin has been created, "replay" software may roll-forward and/or backward to one or more particular points in time, such as to a point when a defect or problem is known, or suspected, to have occurred as the result of a change to the configuration of, for example, an enterprise data management environment. To this end, FIG. 5 discloses a digital twin control GUI (Graphical User Interface) 500 configured to control, or enable control of, a simulation to start, in this illustrative example, at time T0 and then simulate all data management operations, or other operations involving a change to the configuration of a system such as a data management system, up to and including time T4. In general, a simulation may begin, and end, at any specified times. Thus, a simulation need not start at time T0, or at any other particular time.

The scope and nature of operations to be replayed in the simulated operations may be tuned. For example, if a problem is known, or suspected, to have resulted from a database operation that added or changed data at a particular time T, only database operations, and possibly only for the affected database, may need to be replayed up to time T, while MS Outlook operations, for example, that took place prior to, or at, time T, may not have to be replayed since they were not identified as the cause of the problem. By appropriately tuning the replay operations, the scope of operations that may need to be replayed may be limited to a size no larger than necessary, thus enabling rapid replay of operations. As noted herein, the scope of the invention is not limited to data operations, and other examples of operations that may be replayed in order to enable diagnosis, and rectification, of an error, include system configuration changes, such as changes to hardware and/or software of the system, including addition and/or removal of hardware and/or software to/from the system, and the running of an application in the system.

Figure 5:
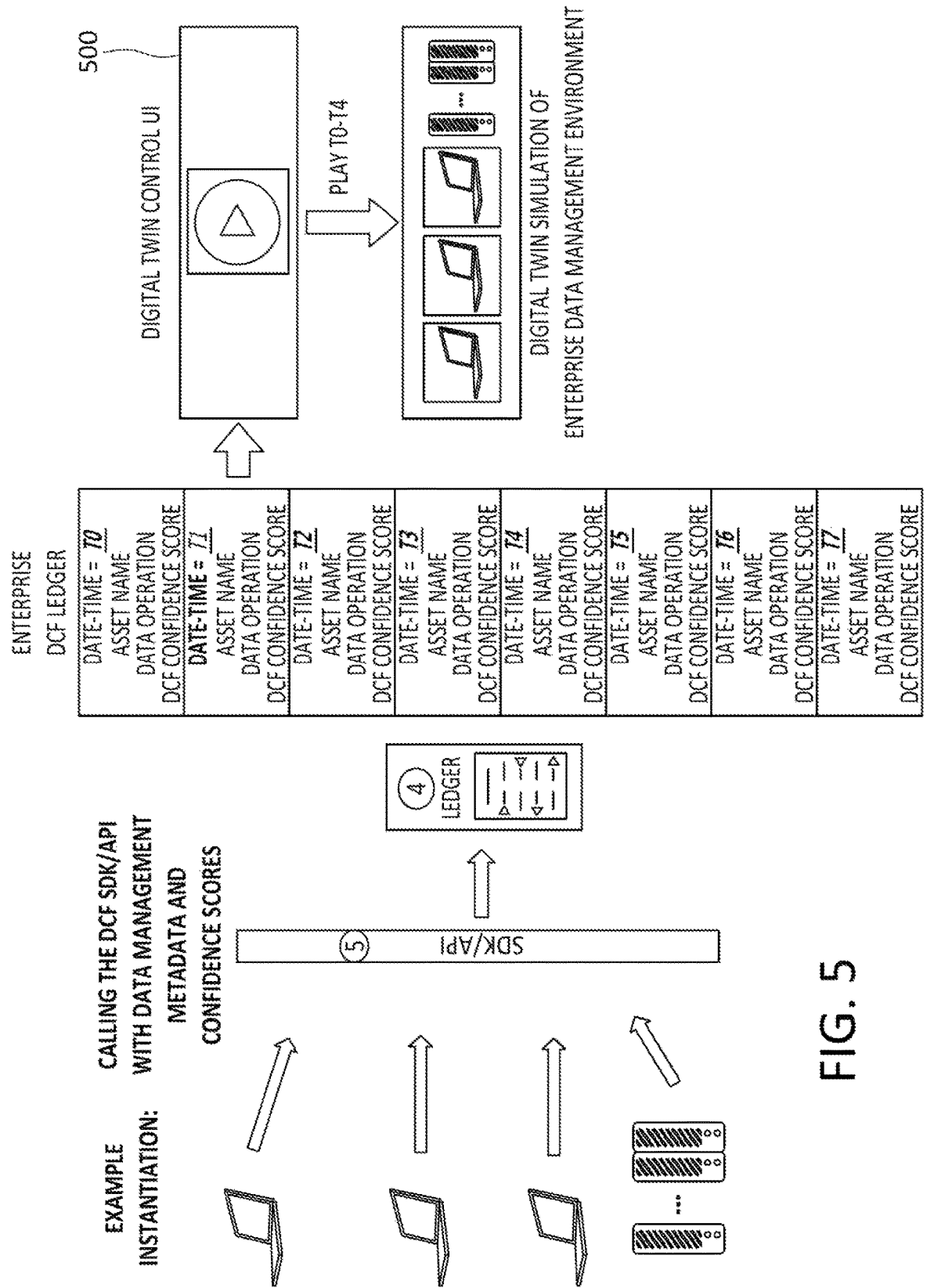
FIG. 5 discloses an example digital twin control UI.

By using the example approach disclosed in FIG. 5, the digital twin may be paused at a state in which new functionality can be introduced in the simulation. For example, at time T5, a defect, whose source/cause may be known or unknown, is known to have occurred within the environment. A new piece of software may be introduced into the simulator at this point. This may be referred to as navigating to a digital twin point of insertion.

Figure 6:
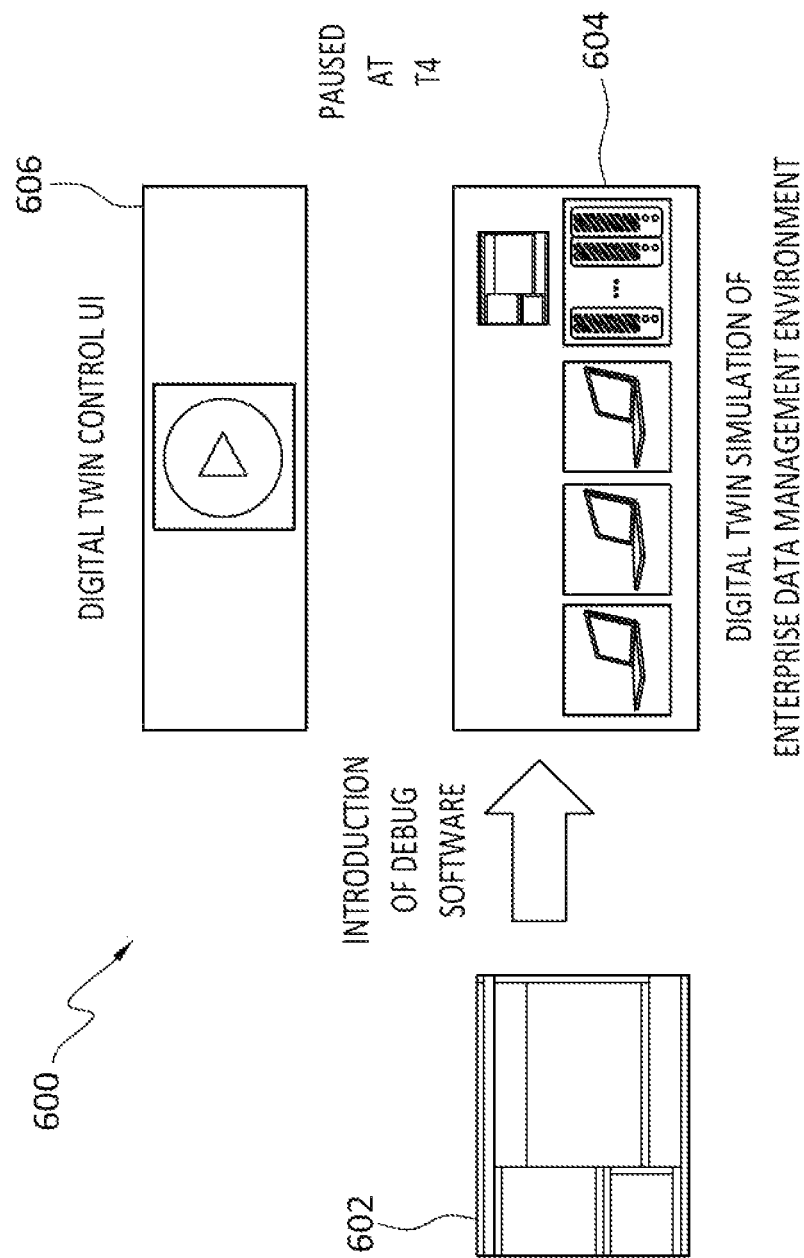
FIG. 6 discloses debug software insertion.

In more detail, and with reference now to FIG. 6, a configuration 600 is disclosed in which a piece of software 602, such as debug software for example, is introduced into a DCF digital twin 604. In some embodiments, the software 602 may be inserted at the time that the DCF digital twin 604 is created while, in other embodiments, the software 602 may not be inserted into the DCF digital twin 604 until after a problem has occurred. As well, the DCF digital twin 604 may be created at any time, such as before, or after, a problem has occurred in the system that is mirrored, or twinned, by the DCF digital twin 604.

FIG. 6 discloses the insertion, such as in response to commands entered by way of the digital twin control GUI 606, of new debug software into the DCF digital twin 604 while the DCF digital twin 604 is paused at time T4. This debug software may determine to observe, for example, a call to update a database row. This update to the database row caused an eventual database crash, such as within a server cluster for example, at time T6. The inserted debug software may now watch the behavior of the server cluster as the database update is replicated in the digital twin 604, and then display on the digital twin control GUI 606, and/or otherwise present to a user, the results observed. More specifically, with the new debug software installed, the DCF digital twin 604 may now roll-forward in time as discussed below in connection with FIG. 7.

Figure 7:
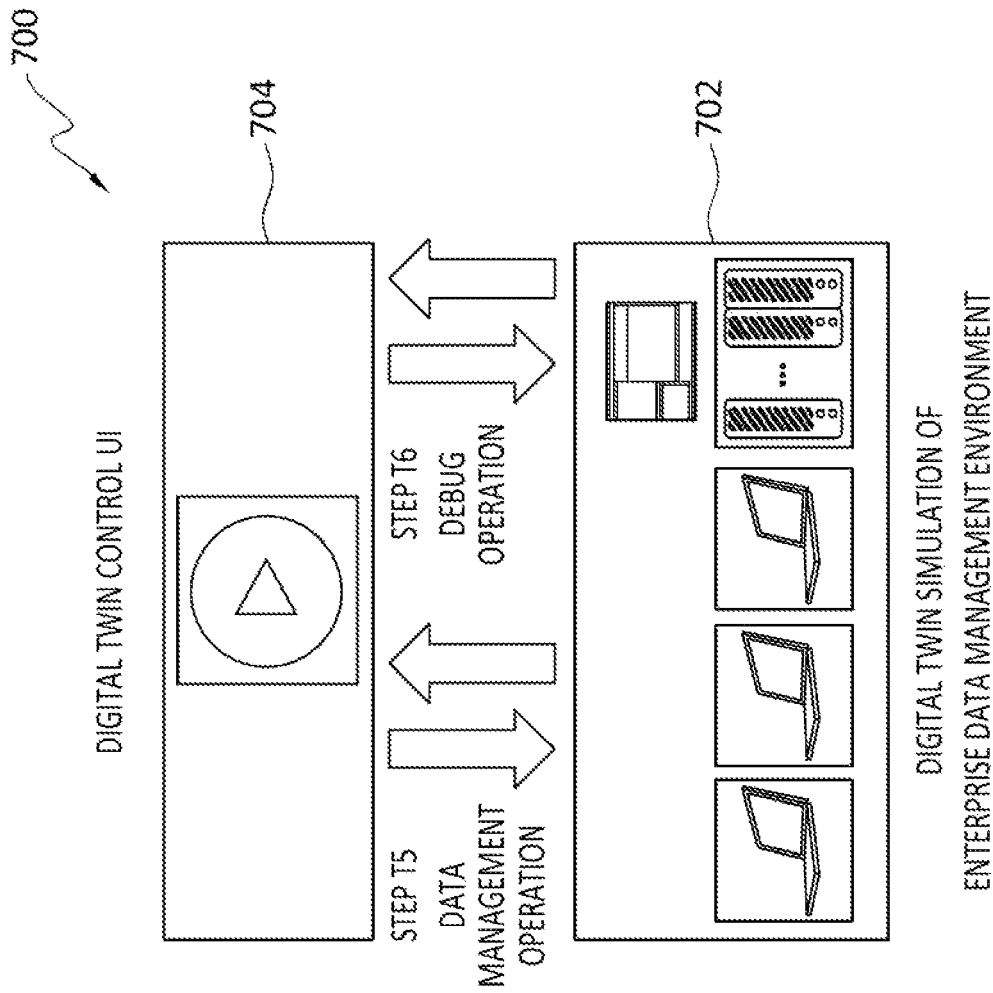
FIG. 7 discloses an example step-by-step simulation with additional debugging.

In general, FIG. 7 discloses a configuration 700 for forward-replay of DCF digital twin simulator 702 and, more particularly, highlights the ability to roll-forward the DCF digital twin simulator 702 in a step-by-step manner, with additional debugging performed at one or more particular points in time, and/or on an ongoing basis as simulated operations occur. Such roll-forward, and other, operations may be viewed and/or controlled by way of a digital twin control UI 704. The ability to create a digital twin using transactions, configuration changes, and data operations, captured in a DCF ledger may enable a new debug window to observe operations. With reference to the particular example of FIG. 7, as a data management operation occurs at Time T5 occurs and, at that time, the debug window, which may be graphically displayed for example by the digital twin control UI 704, may indicate normal operation. However, as the debug operation occurs at Time T6, the debug window, which may be generated by the debugging software, may display an error code that may have been initially lost, or not generated for some reason, when the original problem occurred. The error code may now enable an engineer or other personnel to correct the defect that originally caused the problem. Thus, the debug process may occur on an ongoing basis as normal simulation operations are performed by the digital twin, or the debug process may take place after-the-fact once simulation operations by the digital twin have been completed. Any or all of the operations of the digital twin may be controlled by way of the digital twin control UI 704.

Digital twin functionality, such as that disclosed in connection with the discussion of FIG. 7, and elsewhere herein, may lend itself to monetization. More specifically, the vendor of the software package containing the defect discovered in the example of FIG. 7 may wish to purchase or otherwise use the DCF digital twin generation approach and functionality to test planned operations such as data management operations (for example, read, write, delete, move, copy, replicate, backup, restore) and/or to qualify new versions of software and hardware in more realistic environments, and prior to actual deployment of the software in a production environment.

Thus, an opportunity may be presented for the implementors of DCF digital twins to monetize, for example, their DCF digital twin ledgers. For example, the digital twin service provider may provide a sanitized version of their ledger to vendors and receive payment for vendor access to that ledger and/or to the digital twin simulation operations and results.

As another example, a digital twin service provider may provide an increasingly less-sanitized version of their ledger, that is, relatively more ledger metadata may be made available, to vendors for increasingly higher fees. More particularly, various service levels may be defined, each of which corresponds to an extent to which ledger information may be made available to a customer so that, for example, access to all of the ledger information may be more expensive than access to only a portion of the ledger information.

In any case, embodiments of the invention may enable monetization of digital twin services and information to vendors to allow vendors to run their software and hardware within a sanitized, isolated, and diagnostic, environment for a fee. Further, such embodiments may allow vendors to run their software and hardware within an increasingly less-sanitized environment, that is, with relatively more metadata available for the vendor to inspect, for a relatively larger fee.

Figure 8:
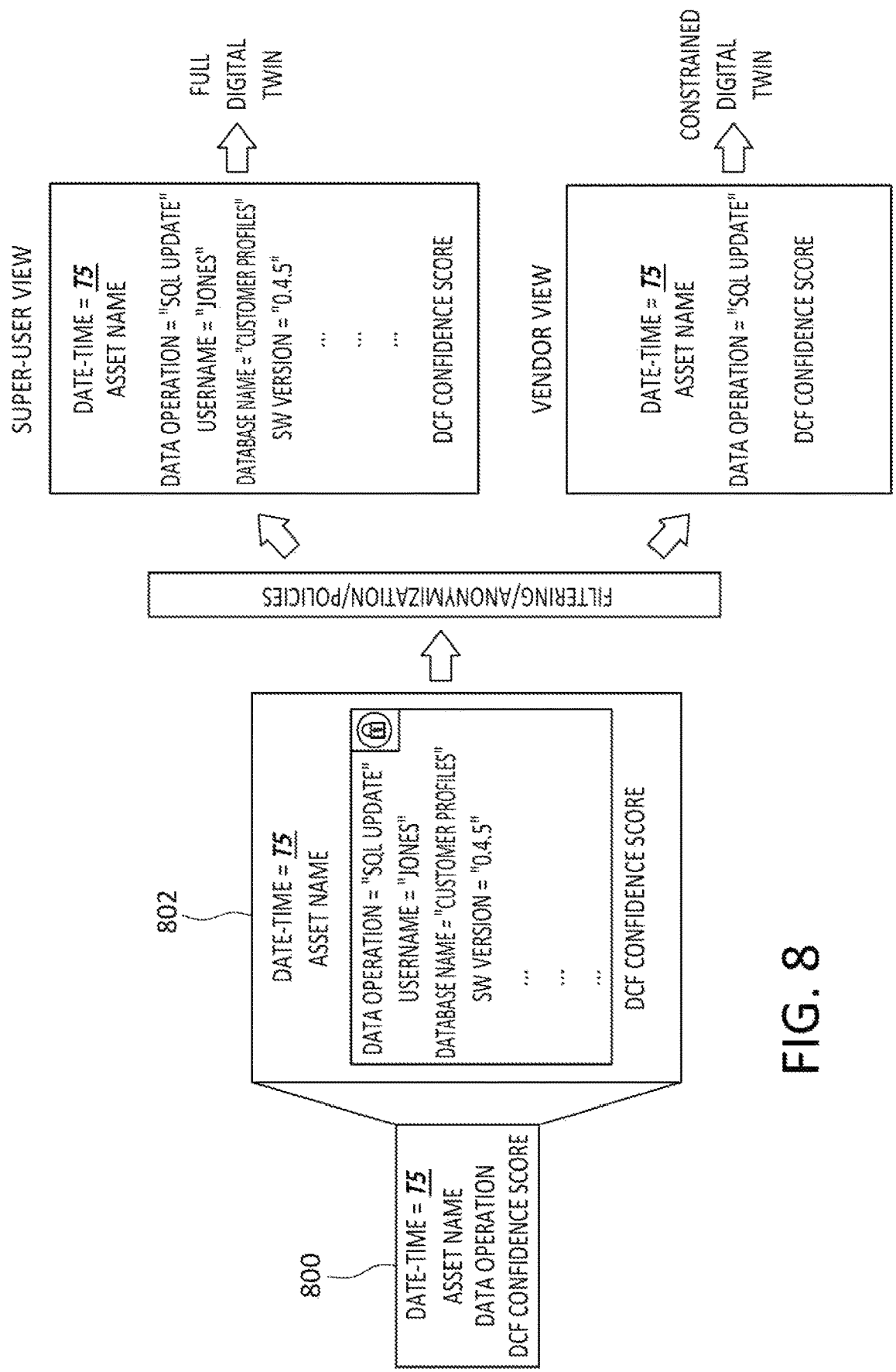
FIG. 8 discloses permissioned access to DCF-based digital twin.

With reference now to FIG. 8, further details are provided concerning aspects of an example approach to ledger creation and use such as may be employed by a digital twin service provider. In the example of FIG. 8, permission tiers for permissioned access to DCF digital twins are disclosed, along with an expanded view of an example ledger entry.

More particularly, FIG. 8 discloses a ledger entry 800 and an expanded view 802 of ledger entry 800. In this example, the expanded view 802 may include more detailed information about a data operation, such as the Data Operation 'SQL Update,' including, for example, metadata such as the operation type, user name, database name, and software versions. Moreover, as indicated by the lock icon in the expanded view 802, the example fields in the expanded view 802 may be filtered or anonymized in accordance with different types of policies and access rights. For example, a 'super-user' may have access to everything, that is, all the information in the ledger, which enables the construction of a full digital twin. This full digital twin may also allow the super-user to access the actual data that was in use at the time. A super-user may, for example, be an employee of a digital twin service provider.

A vendor, on the other hand, may only know that a 'SQL update' command happened, and the vendor may have no visibility into the underlying data related to the command, or to other fields such as the 'Username.' This granular approach to ledger access may enable the construction of a "constrained" digital twin which is customized to the needs of particular vendor or vendors, and which still allows for valuable replay and simulation capabilities, but with limited visibility into all features and ledger information. As noted herein, it may be possible for a vendor to gain greater access to functionality and data/metadata by payment of a relatively higher fee.

Figure 9:
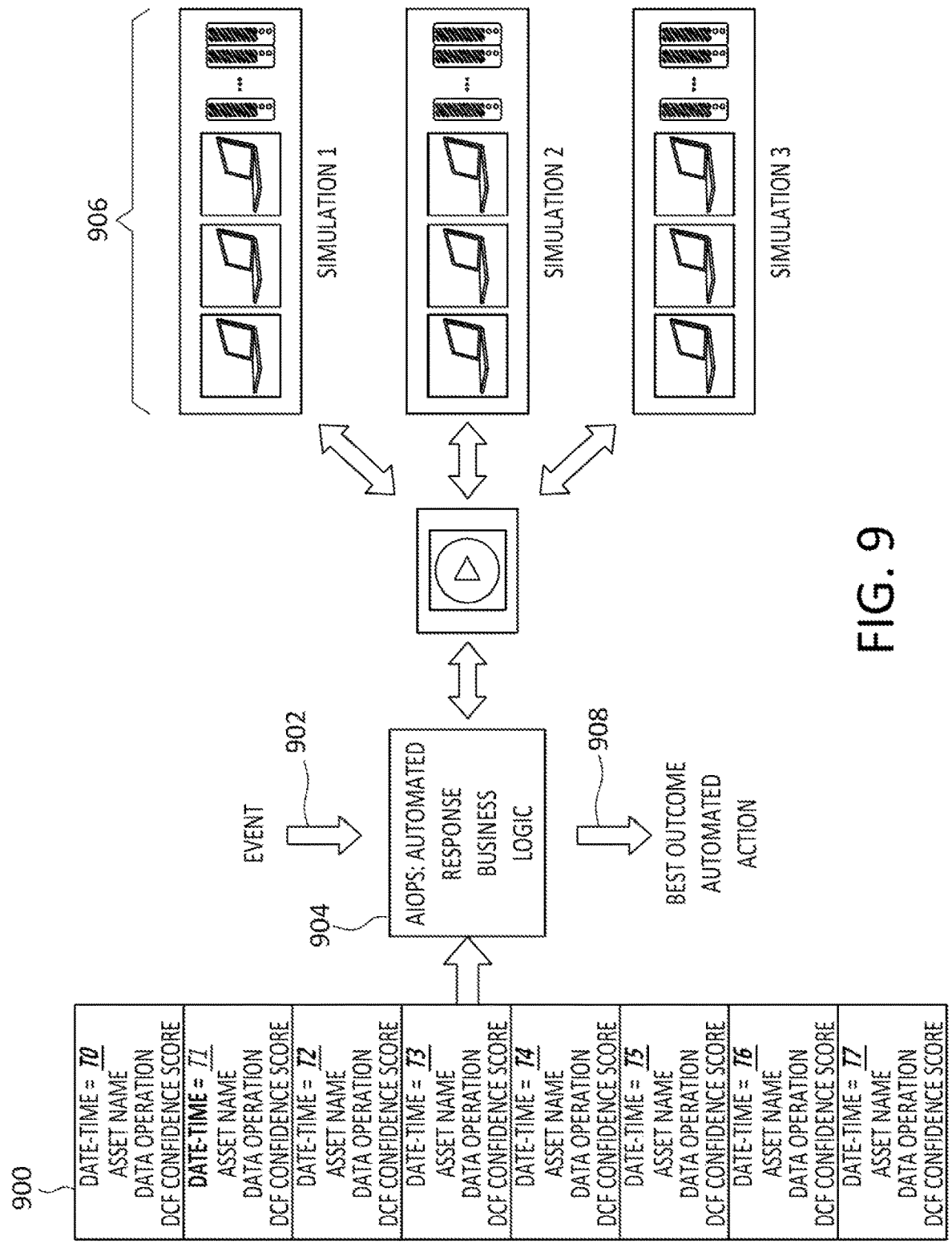
FIG. 9 discloses how AIOps digital twin simulation may influence automated decisions.

Turning now to FIG. 9, details are provided concerning a n example of a live DCF digital twin scenario modeling for automated decision-making. Particularly, the example of FIG. 9 shows the use of a DCF-enabled digital twin to simulate and observe potential best-outcomes in an AIOps use case.

FIG. 9 discloses live usage of a DCF ledger 900 in a production environment, as distinguished from a simulation environment in which a digital twin may enable performance of simulated production environment events. An event 902 occurs, such as a change to data, hardware, and/or software, associated with the production environment. The event may trigger instantiation of scripted business logic that handles the event. Normal scripted business logic 904, such as AIOps processing for example, may be hardcoded to make only one decision. In contrast, example approaches embraced by one or more embodiments of the invention may enable a script to explore and run, in the example of FIG. 9, three different simulated options 906, and then choose and implement the option 908 that appears to be the most favorable outcome in terms of impact to the production environment. In some embodiments, none of the simulations may be acceptable, and the scripted business logic 904 may run further simulations.

Consider, for example, a data set which experiences corruption. When this corruption event is detected, an automated decision may be made by the script to restore the data set to a point-in-time snapshot from 5 minutes earlier. If the point-in-time snapshot had already experienced a corruption, however, the automated decision would end up being a bad one since the restore would be made to a point in time when the data had already been corrupted.

A script such as an AIOps DCF simulation engine (DCF-SE), however, may create any number of DCF simulations, which may be based on available compute power, and try a wider variety of experiments with respect to the detected corruption event. For example, twenty-four simulations could be created, and different point-in-time versions from the previous 24 hours could be restored and tested, in a DCF digital twin, as potential solutions, and the outcome of the implementation of each potential solution could then be observed, and the best solution then selected and implemented in the production environment.

Each of the simulations may also capture and track data confidence values. The AIOps DCF-SE, or other script, can choose the simulated result that has the highest resulting confidence score indicating that particular outcome has measurably higher trust than other simulated outcomes. The outcome with the highest confidence level may then be fed from the digital twin back to the AIOps framework, which then conducts the automation, that is, the automated implementation of, in the example of FIG. 9, the restore process. At the same time, the simulated results may be logged as a way of enabling future forensic discovery of why the decision to implement a particular solution was made. In contrast, conventional approaches to simulation do not, and cannot, for example, actually measure the confidence of future simulated outcomes, record the resulting confidence score in an audit log, and then drive higher-confidence AIOps automated outcomes on the fly.

Finally, it is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

D. Example Methods

Figure 10A:
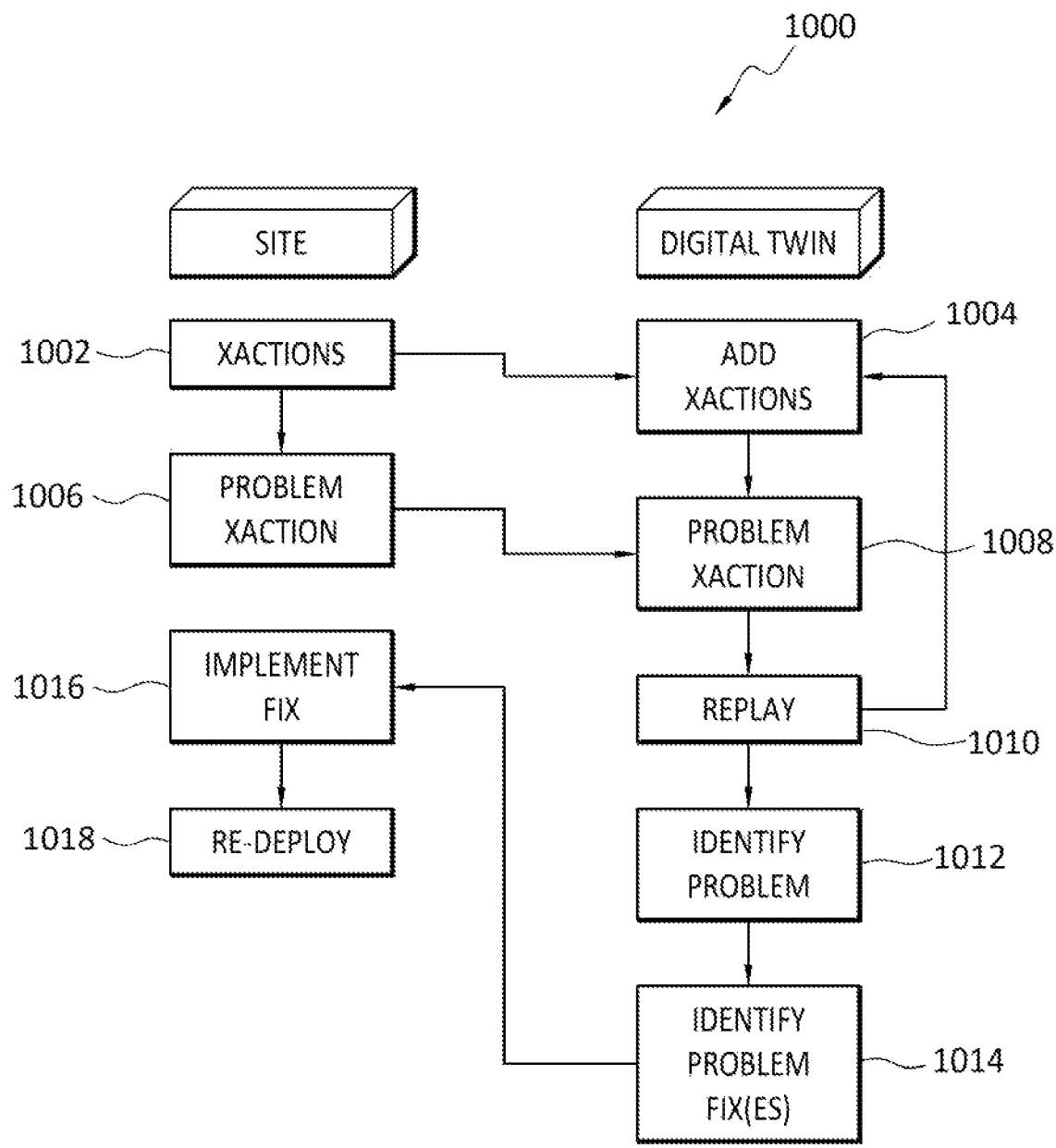
FIG. 10a discloses an example method of resolving a problem after-the-fact using a digital twin.
Figure 10B:
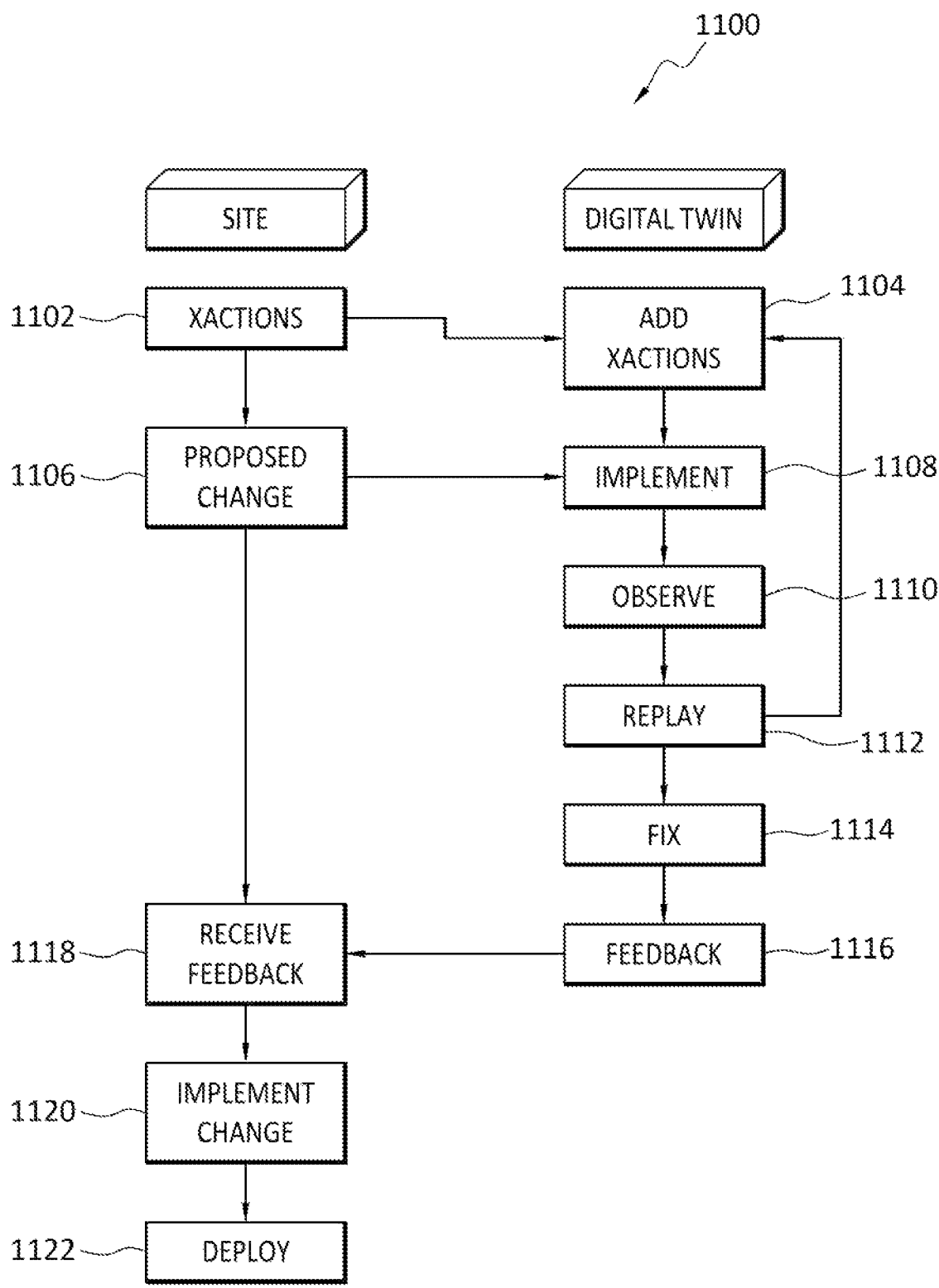
FIG. 10b discloses an example method of prospectively identifying and resolving a problem using a digital twin.

It is noted with respect to the example method of FIG. 10 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just Directing attention now to FIGS. 10a and 10b, details are provided concerning example methods and modes for implementation and use of a digital twin. These methods and modes may be cooperatively implemented by a site, such as a production site/vendor for example, and a digital twin. A digital twin may be created and hosted at, for example, a remote cloud computing/storage site, on premises at a production site, or at a vendor site.

The example method 1000 disclosed in FIG. 10a involves after-the-fact problem identification and resolution with the use of a digital twin. By way of contrast, the example method 1100 disclosed in FIG. 10b is concerned with preemptive problem identification and resolution with the use of a digital twin. Embodiments of the methods disclosed in FIGS. 10a and 10b, like the other methods disclosed herein, may be implemented in connection with a DCF and a data management system, but that is not required.

With reference now to the example of FIG. 10a, the method 1000 may begin at 1002 where one or more transactions or changes are implemented at a site, such as at a production site or vendor site, for example. Such changes may comprise, for example, changes to hardware and/or software of the site, and one or more data management operations. As these changes are implemented at the site, they may be implemented at the digital twin as well 1004, such as by updating a ledger at the digital twin to reflect the changes or transactions.

At some point, a change, such as a database update for example, may be implemented 1006 at the site that causes a problem. The problem need not take any particular form but may involve, for example, a malfunction in hardware or software at the site, introduction of a programming bug, or any other event that causes a deviation from normal and/or expected operations at the site. The change that caused the problem may, like normal transactions, be added to the digital twin 1008, along with data and/or metadata describing the nature of the transaction, the problem, and any other information relating to the transaction.

The transactions 1004 and 1008 may then be replayed 1010 at the digital twin, such as by way of a UI, until the time when the problem occurred, and the state of the site immediately prior to, during, and following, the problem has been determined. That is, the problem may be identified 1012 by replaying the transactions 1004 and 1008, and then resolved 1014. The solution to the problem may then be communicated to the site, and implemented 1016. After implementation of the fix 1016, the hardware, software, operation, or other entity/operation that cause the problem may then be re-deployed 1018.

In some instances, it may be possible to prospectively identify and resolve problems prior to their actual occurrence at a site, such as a production site or vendor site, for example. With reference next to FIG. 10b, an example method 1100 is disclosed that, like the method 1000, may be cooperatively performed by two or more entities, such as a production site and digital twin for example. In some implementations, the production site, or other site, may comprise an AIOps platform, and/or a vendor site/platform, that performs one, some, or all, of the site operations disclosed in FIG. 10b.

The method 1100 may begin at 1102 where one or more transactions or changes are implemented in a system, such as at a site, which may or may not comprise a production site or a vendor site, for example. Such changes may comprise, for example, changes to hardware and/or software of the site, and one or more data management operations. As these changes are implemented at the site, they may be implemented at the digital twin as well 1104, such as by updating a ledger at the digital twin to reflect the changes or transactions.

At some point, a vendor, for example, or an AIOPs platform, may wish to make a change to hardware and/or software, for example, at the site. This proposed change, not yet actually implemented, may be communicated 1106 to the digital twin. The change may be implemented 1108 and run at the digital twin. Before, during, and/or after, the change is implemented 1008, the state and response of the digital twin may be observed 1110. In some circumstances the observations 1110 may include an observation that a problem has resulted from the implementation of the change. In this case, the various transactions occurring before, during, and/or, after, the implementation of the change may be replayed 1112 to determine when the problem occurred, and what the state of the digital twin was before, during, and/or after, the problem took place.

One or more fixes 1114 may then be identified for the problem. The one or more fixes may then communicated as feedback 1116 to the site. The feedback 1116 is then received 1118, and appropriate changes to avoid the problem, implemented 1120. Note that in the example where the site operations of FIG. 10b are performed by an AIOps platform, that AIOps platform may request/run various simulations at the digital twin to identify multiple different possible solutions 1114. The same approach may be employed where the site operations of FIG. 10b are performed by a vendor, with the further possibility that the vendor communications with the digital twin may take place in connection with the provision of digital twin services to the vendor by way of an SaaS model, examples of which are disclosed herein.

In any case, once the desired solution is implemented 1120, the corresponding hardware, software, data management operations, or other changes may then be deployed 1122. Such deployment may take place at, for example, a vendor site, or a data management site that comprises an AIOps platform.

E. Further Example Embodiments

Following are some further example embodiments of the invention. These are presented only by way of example and are not intended to limit the scope of the invention in any way.

Embodiment 1. A method, comprising: receiving a transaction at a digital twin that incorporates all transactions that have occurred at a site from which the transaction was received, and wherein the digital twin was created based in part on a data confidence fabric ledger; entering the transaction in the data confidence fabric ledger at the digital twin; receiving another transaction at the digital twin, wherein the another transaction has caused a problem to occur; entering the another transaction in the data confidence fabric ledger; replaying any transactions that have occurred in a defined time window that includes the another transaction; based on the replaying, identifying a state of a system where the problem occurred, and a time when the problem occurred; and determining a resolution to the problem.

Embodiment 2. The method as recited in embodiment 1, wherein the transaction and the another transaction are received from a vendor site, and the problem concerns hardware and/or software sourced by a vendor associated with the vendor site, and at least part of the data conference fabric ledger is made accessible to the vendor.

Embodiment 3. The method as recited in any of embodiments 1-2, wherein the transaction and the another transaction are received from a data management site, and the problem concerns a data management operation implemented at the data management site.

Embodiment 4. The method as recited in any of embodiments 1-3, wherein the digital twin assigns a confidence level to the resolution, and the confidence level indicates a confidence as to how the site is expected to respond when the resolution is implemented at the site, and the resolution was selected for implementation based on a comparison of the confidence level of the resolution with a respective confidence level of one or more other possible solutions.

Embodiment 5. The method as recited in any of embodiments 1-4, wherein the another transaction relates to a problem that has actually occurred at the site by the time the another transaction has been entered into the data confidence fabric ledger.

Embodiment 6. The method as recited in any of embodiments 1-5, wherein the resolution relates to a problem that has not actually occurred at the site by the time the another transaction has been entered into the data confidence fabric ledger.

Embodiment 7. The method as recited in any of embodiments 1-6, wherein the another transaction is received from an AIOps platform hosted at the site.

Embodiment 8. The method as recited in any of embodiments 1-7, wherein the resolution to the problem is made available to an AIOPs platform hosted at the site.

Embodiment 9. The method as recited in any of embodiments 1-8, wherein the site comprises a vendor site, and the resolution to the problem is made available to the vendor site.

Embodiment 10. The method as recited in any of embodiments 1-9, wherein at least part of the method is instantiated in response to a request by an AIOps platform.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 11:
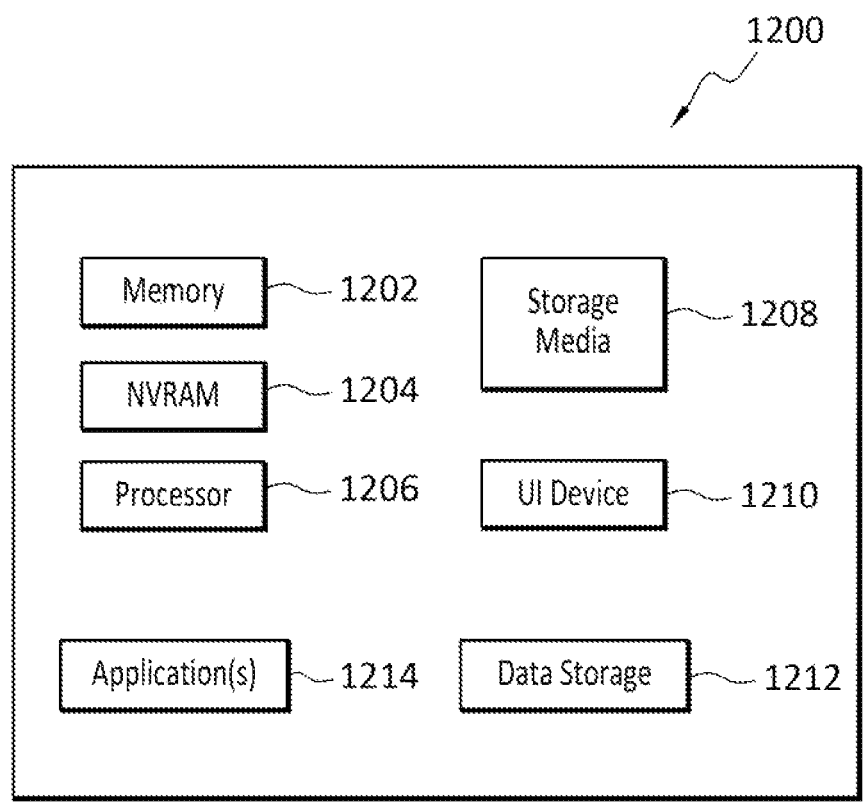
FIG. 11 discloses an example computing entity configured to perform any of the methods and processes disclosed herein.

With reference briefly now to FIG. 11, any one or more of the entities disclosed, or implied, by FIGS. 1-10b and/or elsewhere herein, may take the form of, or include, or be implemented on, or hosted by, a physical computing device, one example of which is denoted at 1200. As well, where any of the aforementioned elements comprise or consist of a virtual machine (VM), that VM may constitute a virtualization of any combination of the physical components disclosed in FIG. 11.

In the example of FIG. 11, the physical computing device 1200 includes a memory 1202 which may include one, some, or all, of random access memory (RAM), non-volatile memory (NVM) 1204 such as NVRAM for example, read-only memory (ROM), and persistent memory, one or more hardware processors 1206, non-transitory storage media 1208, UI device 1210, and data storage 1212. One or more of the memory components 1202 of the physical computing device 1200 may take the form of solid state device (SSD) storage. As well, one or more applications 1214 may be provided that comprise instructions executable by one or more hardware processors 1206 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    receiving a transaction at a digital twin that incorporates all transactions that have occurred at a site from which the transaction was received, and wherein the digital twin was created based in part on a data confidence fabric ledger;
    entering the transaction in the data confidence fabric ledger at the digital twin;

receiving another transaction at the digital twin, wherein the another transaction has caused a problem to occur;

entering the another transaction in the data confidence fabric ledger;

replaying any transactions that have occurred in a defined time window that includes the another transaction;

based on the replaying, identifying a state of a system where the problem occurred, and a time when the problem occurred; and determining a resolution to the problem, wherein the resolution relates to a problem that has not actually occurred at the site by the time the another transaction has been entered into the data confidence fabric ledger, and the resolution to the problem is made available to the site.

2. The method as recited in claim 1, wherein the transaction and the another transaction are received from a vendor site, and the problem concerns hardware and/or software sourced by a vendor associated with the vendor site, and at least part of the data conference fabric ledger is made accessible to the vendor.

3. The method as recited in claim 1, wherein the transaction and the another transaction are received from a data management site, and the problem concerns a data management operation implemented at the data management site.

4. The method as recited in claim 1, wherein the digital twin assigns a confidence level to the resolution, and the confidence level indicates a confidence as to how the site is expected to respond when the resolution is implemented at the site, and the resolution was selected for implementation based on a comparison of the confidence level of the resolution with a respective confidence level of one or more other possible solutions.

5. The method as recited in claim 1, wherein the another transaction relates to a problem that has actually occurred at the site by the time the another transaction has been entered into the data confidence fabric ledger.

6. The method as recited in claim 1, wherein the another transaction is received from an AIOps platform hosted at the site.

7. The method as recited in claim 1, wherein the resolution to the problem is made available to an AIOPs platform hosted at the site.

8. The method as recited in claim 1, wherein the site comprises a vendor site.

9. The method as recited in claim 1, wherein at least part of the method is instantiated in response to a request by an AIOps platform.

10. A non-transitory storage medium having stored therein instructions that are executable by one or more hardware processors to perform operations comprising: receiving a transaction at a digital twin that incorporates all transactions that have occurred at a site from which the transaction was received, and wherein the digital twin was created based in part on a data confidence fabric ledger; entering the transaction in the data confidence fabric ledger at the digital twin; receiving another transaction at the digital twin, wherein the another transaction has caused a problem to occur; entering the another transaction in the data confidence fabric ledger; replaying any transactions that have occurred in a defined time window that includes the another transaction; based on the replaying, identifying a state of a system where the problem occurred, and a time when the problem occurred; and determining a resolution to the problem, wherein the resolution relates to a problem that has not actually occurred at the site by the time the another transaction has been entered into the data confidence fabric ledger, and the resolution to the problem is made available to the site.

11. The non-transitory storage medium as recited in claim 10, wherein the transaction and the another transaction are received from a vendor site, and the problem concerns hardware and/or software sourced by a vendor associated with the vendor site, and at least part of the data conference fabric ledger is made accessible to the vendor.

12. The non-transitory storage medium as recited in claim 10, wherein the transaction and the another transaction are received from a data management site, and the problem concerns a data management operation implemented at the data management site.

13. The non-transitory storage medium as recited in claim 10, wherein the digital twin assigns a confidence level to the resolution, and the confidence level indicates a confidence as to how the site is expected to respond when the resolution is implemented at the site, and the resolution was selected for implementation based on a comparison of the confidence level of the resolution with a respective confidence level of one or more other possible solutions.

14. The non-transitory storage medium as recited in claim 10, wherein the another transaction relates to a problem that has actually occurred at the site by the time the another transaction has been entered into the data confidence fabric ledger.

15. The non-transitory storage medium as recited in claim 10, wherein the another transaction is received from an AIOps platform hosted at the site.

16. The non-transitory storage medium as recited in claim 10, wherein the resolution to the problem is made available to an AIOPs platform hosted at the site.

17. The non-transitory storage medium as recited in claim 10, wherein the site comprises a vendor site.

18. The non-transitory storage medium as recited in claim 10, wherein at least part of the non-transitory storage medium is instantiated in response to a request by an AIOps platform.

* * * * *